United States Patent [19]
Reinert, Sr.

[11] Patent Number: 5,594,201
[45] Date of Patent: * Jan. 14, 1997

[54] ADJUSTABLE CONTAINER SET APPARATUS AND METHOD

[76] Inventor: Gary L. Reinert, Sr., 4319 Middle Rd., Allison Park, Pa. 15101

[ * ] Notice: The term of this patent shall not extend beyond the expiration date of Pat. No. 5,594,201.

[21] Appl. No.: 58,356

[22] Filed: May 10, 1993

[51] Int. Cl.$^6$ .................................................. F21V 19/02
[52] U.S. Cl. ........................ 174/37; 174/48; 362/153.1; 362/285; 362/418
[58] Field of Search ................... 174/37, 48; 362/145, 362/153, 153.1, 285, 366, 418

[56] References Cited

U.S. PATENT DOCUMENTS

| | | | |
|---|---|---|---|
| 3,956,573 | 5/1976 | Myers | 174/48 |
| 4,382,274 | 5/1983 | De Backer et al. | 362/153 |
| 4,622,435 | 1/1986 | Trainor et al. | 174/57 |
| 4,914,544 | 4/1990 | Dahlberg | 362/153.1 |
| 4,924,364 | 5/1990 | Pannier | 362/153.1 |

FOREIGN PATENT DOCUMENTS

| | | |
|---|---|---|
| 0716501 | 6/1968 | Belgium . |
| 0837976 | 1/1976 | Belgium . |

OTHER PUBLICATIONS

U.S. Department of Transportation, Federal Aviation Administration, Advisory Circular, AC No. 150/5345-42C "Specification for Airport Light Bases, Transformer Housings, Junction Boxes, and Accessories," dated Jun. 8, 1989, pp. i–iv, 1–34.
Olson Industries, Drawing "L–868 Bottom Section" Oct. 29, 1991.
Olson Industries, Drawing "L–868 Middle Section" Oct. 29, 1991.
Olson Industries, Drawing "L–868 Top Section" Oct. 29, 1991.
Olson Industries, Drawing "L–868 Spacer Ring" Jun. 8, 1989.
Olson Industries, Drawing "L–867 Extension", 2 pages Jun. 8, 1989.

*Primary Examiner*—Kristine L. Kincaid
*Assistant Examiner*—Paramita Ghosh
*Attorney, Agent, or Firm*—Douglas G. Glantz

[57] ABSTRACT

A height and azimuth adjustable container is disclosed as a base for lighting fixtures, transformer housings, and junction boxes and provides precise and simplified aligning of lighting fixtures to be mounted on it. The height and azimuth adjustable container provides a precise and simplified adjustable aligning of lighting fixtures for azimuth alignment.

18 Claims, 1 Drawing Sheet

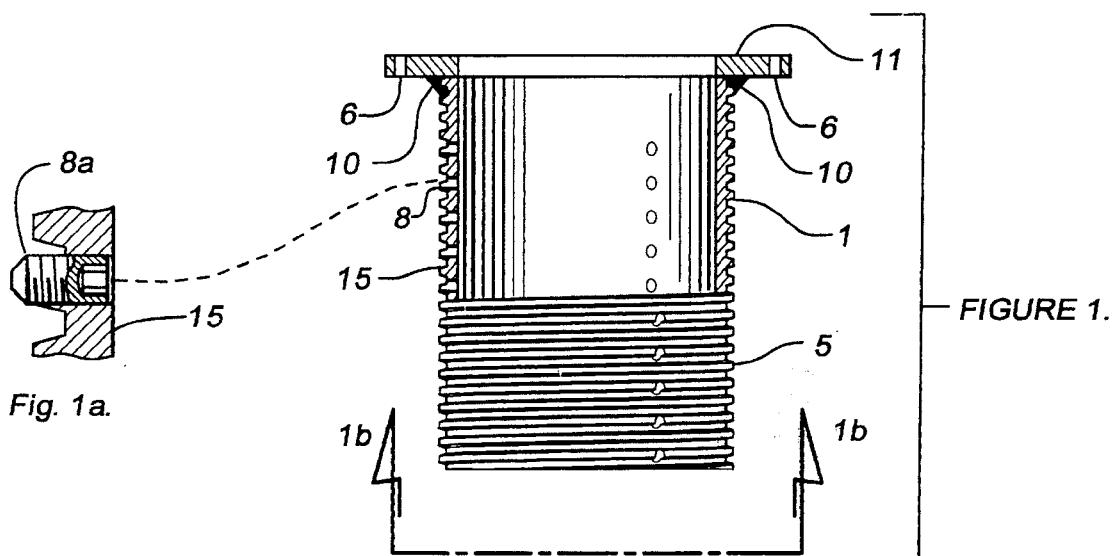
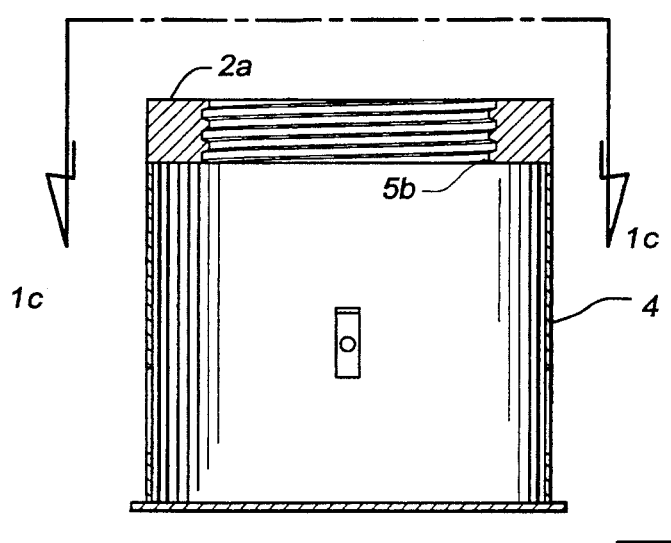
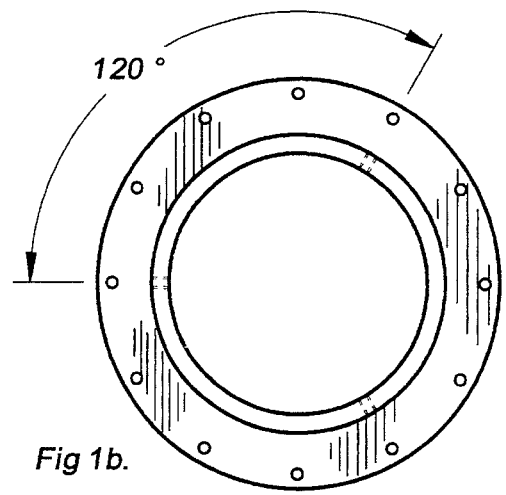
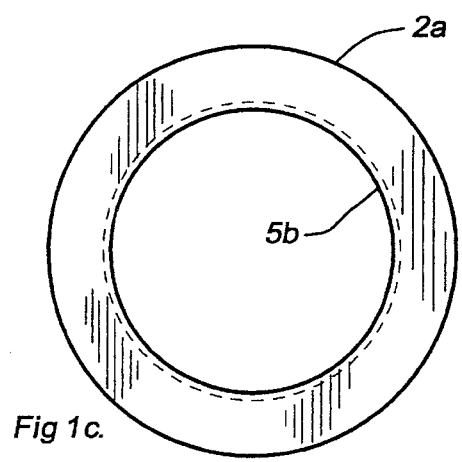
FIGURE 1.
Fig. 1a.
Fig 1b.
Fig 1c.

ADJUSTABLE CONTAINER SET APPARATUS AND METHOD

This invention refers to a height and azimuth Adjustable Container Set utilized for the more economic, precise and simplified adjusting of the heights of embedded containers and the alignment of their light fixtures. These containers are installed in airport runways and taxiways to serve as bases for lighting fixtures, transformer housings and as junction boxes.

BACKGROUND OF THE INVENTION

In the installation of airport runway touchdown zone, centerline and edge lighting systems, as well as in the installation of taxiway centerline and edge lighting systems, and other lighting systems, certain steel containers are utilized. These containers are embedded in the runway, taxiway and other pavements at the time these runway and taxiway pavements are poured.

These containers, hereinafter referred to as embedded containers, vary in length and diameter. The existing old art containers provide an inverted flange at their top portion, which has a standard set of threaded holes to allow for the runway, taxiway, edge and other light fixtures to be bolted onto them above the pavement surface, or to allow for the top section of the container to be bolted onto the bottom section, if it is a two-section container. A great majority of these existing, old art containers are two section containers, bolted together at their inverted flanges. The light fixture is then bolted onto the top inverted flange of the top section of the two-section container.

The top section of the two-section containers are herewith referred to as the fixed length extension, which is part of the old art embedded containers.

The light fixtures installed on said embedded containers, have to be aligned with respect to each other, in a pefectly straight line, on the horizontal plane and their height has to be set within a fixed, strict tolerance, measured from the pavement surface.

These embedded containers below the pavement surface serve as light fixture bases. They also serve as transformer housings and junction boxes. Depending on the location where these containers are installed they are exposed to varying degrees and types of forces applied to them by the aircraft and other vehicular traffic in that location. For example, runway and taxiway centerline light fixtures and the containers they are bolted onto, are subjected to direct aircraft and other heavy vehicular loading applied to the top flange of the container and transmitted down to its walls.

One additional aspect of the installation of the light fixtures upon the embedded containers is their alignment with respect to each other, in a perfectly straight line, known as azimuth correction.

It is therefore a principal object of the invention to provide a method and means for adjusting with precision and simplicity the height the azimuth of embedded containers and for aligning, with great simplicity and precision the lighting fixture that are installed upon the apparatus and method of the present invention.

The means by which the precise height adjustments and the precise azimuth corrections of the, new art will be made, is generally described as the Adjustable Container Set.

A further object of the invention is to provide a method and means for adjusting the height of embedded containers without having to install individual fixed length extensions and flat rings.

These and other objects of this invention will be apparent to those skilled in the art.

BRIEF DESCRIPTION Of THE DRAWING

FIG. 1, 1A–1C is a schematic of Adjustable Container 4 and a top view of its welded-on, inverted, Acme Threaded Flange 2a; Adjustable Extension 1 and a top view of its Flange 11; threaded through Holes 8 (one set of ten is shown) and also Allen Set Screws 8a.

SUMMARY OF THE INVENTION

A method and means is provided for an Adjustable Container Set, which is comprised of an Adjustable Container, with an inverted flange on one end. Said flange has Acme threads in its center hole.

This method and means is also comprised of an outside Acme threaded Adjustable Extension, which threads down into the Adjustable Container's inverted flange, in order to provide the precise height required and the precise alignment of its lighting fixture. Said Adjustable Height Extension has at its top a flange, in order to provide a base upon which the specified lighting fixture can be bolted.

The Adjustable Extension and the Adjustable Container used combined, are generally described as the Adjustable Container Set.

The Adjustable Container Sets are applicable to new installations.

DESCRIPTION OF THE PREFERRED EMBODIMENT

It consists of Adjustable Container 4, which combined with Adjustable Extension 1, become the Adjustable Container Set.

Adjustable Extension 1 is of cylindrical form and it has Acme Threads 5 on the full length of its outside surface; four threads per inch have been proven to provide a smooth, precise and quick height adjustment capability. Adjustable Extension 1 has Flange 11 continuously welded 10 to its upper end. The bolt circle on Flange 11 and the bolt circle on the light fixture are identical because Flange 11 is to be used as the new base for installing the lighting fixtures that were previously bolted to the inverted Flange on the fixed length extension that was bolted onto embedded Container 3, or for installing new lighting fixtures if the old lighting fixtures are being replaced.

Adjustable Extension 1, along Wall 15 of its cylindrical body, has ten sets of three each threaded Holes 8, at 120 degrees from each other, threaded for ⅜ of one inch, stainless steel, Allen Set Screws 8a.

Said Allen Set Screws 8a provide the means for locking Adjustable Extension 1 onto Flange 2a of Adjustable Container 4.

The Adjustable Extension 1 is also used in runways, new taxiways and other new aircraft traffic areas, where the "old art" containers are being installed.

Inverted Flange 2a, which is on one end of Adjustable Container 4, has its center hole threaded with 4 Acme threads per inch 5b, the same threads as the outside length of Adjustable Extension 1, which will be threaded into said Flange 2a.

For new installations, where the new art Adjustable Container Sets are installed, Adjustable Containers 4 are utilized. Said Adjustable Containers 4 have inverted Flange 2a, welded on one end. Said Flange 2a has its center hole threaded with 4 Acme threads 5b per inch, the same threads as the outside length of Adjustable Extension 1, which will be threaded into said Flange 2a.

For new installations, where the new art, Adjustable Containers 4 (one of the elements of this invention) are being installed, the adjustment process simply starts by threading Adjustable Extension 1 into the center hole of Flange 2a of Adjustable Container 4. Said Center Hole is threaded with 4 Acme threads per inch, the same as Extension 1, as previously explained.

Therefore, the height and azimuth adjustments are achieved by threading Adjustable Extension 1 down into Flange 2a, up to the precise height adjustment and the precise azimuth alignment required. The light fixture has to be temporarily bolted onto Flange 11, in order to do the adjustments, two bolts are sufficient for this purpose. After the adjustments are completed, tick marks are made on the pavement, the light fixture and Flange 2a before the light fixture is removed. After removing the light fixture, the Adjustable Extension 1 is firmly secured in that position to Flange 2a by means of three stainless steel Allen Set Screws 8a, which are threaded in through Holes 8, drilled and tapped on Wall 15 of Adjustable Extension 1. Said Screws 8a also provide the required resistance to torque applied perpendicularly to the vertical axis of Adjustable. Extension 1.

Thus, it can be seen that a novel method and means has been provided for adjusting the heights and azimuth of new embedded containers that are used for light bases, transformer housings and junction boxes, in a manner that assures:

1. That the heights can be adjusted with a greater precision and simplicity because an Acme threaded adjustment assembly has been introduced, which allows increases in heights as small as 1/64 of one inch and smaller. It requires four complete turns of Adjustable Height Extension 1 for it to adjust one inch in height.

2. That the light fixtures can be aligned with respect to one other in a perfectly straight line, with great precision and simplicity, because the flange upon which the light fixture is bolted can be rotated in the horizontal plane any number of degrees required for azimuth correction.

3. That no fixed length extensions or flat spacer rings be required for height adjustments because an Adjustable Container Set is provided, with which precise adjustments of the container's height, as well as the precise adjustments of height and azimuth of the lighting fixture they support, can be easily made.

Thus, it can be seen that the invention accomplishes at least all of its stated objectives.

What is claimed is:

1. An adjustable alignment container set apparatus, comprising:
   (a) a light fixture support having a container base for placement as a partially embedded support for a light fixture in an airport runway, taxiway, or other aircraft ground traffic area; and
   (b) variable length extension means connected to said container base for adjusting the height and alignment of an airport inset light supported by said light fixture support, wherein said variable length extension means comprises a light support extension canister for holding said airport inset light and having screw threading means for rotatable attachment to said container base and rotation locking means for securing said light support extension canister against rotation through said screw threading means connected to said container base.

2. An adjustable alignment container set apparatus as set forth in claim 1, wherein said variable length extension means is rotatably adjustable for adjusting the height and alignment of said airport inset light supported by said light fixture support.

3. An adjustable alignment container set apparatus as set forth in claim 2, wherein said variable length extension means is rotatably adjustable for adjusting the azimuth alignment of said airport inset light supported by said light fixture support by plus or minus one degree or more.

4. An adjustable alignment container set apparatus as set forth in claim 2, wherein said variable length extension means is rotatably adjustable for adjusting the height of said airport inset light supported by said light fixture support by plus or minus 0.02 inches or more.

5. An adjustable alignment container set apparatus as set forth in claim 2, wherein said screw threading means comprises an inside thread on said container base and an outside thread on said light support extension canister.

6. An adjustable alignment container set apparatus as set forth in claim 5, wherein said inside and outside thread comprises an Acme screw thread of at least about 4 threads per inch.

7. An adjustable alignment container set apparatus as set forth in claim 2, wherein said light support extension canister can be rotated to align the azimuth of said airport inset light with respect to the horizon and to other airport inset lights.

8. An adjustable alignment container set apparatus as set forth in claim 7, wherein said light support extension canister can be rotated any number of degrees to align the azimuth of said airport inset light with respect to the horizon and to other airport inset lights.

9. An adjustable alignment container set apparatus as set forth in claim 2, wherein said light support extension canister further comprises light attachment means on a top flange thereof for securing said airport inset light to said light support extension canister.

10. An adjustable alignment container set apparatus as set forth in claim 9, wherein said light attachment means comprises a plurality of bolt holes spaced apart in the top flange of said light support extension canister.

11. An adjustable alignment container set apparatus as set forth in claim 10, wherein said light attachment means comprises at least 6 bolt holes spaced apart in the top flange of said light support extension canister.

12. An adjustable alignment container set apparatus as set forth in claim 10, wherein said light attachment means comprises at least 12 bolt holes substantially equally spaced and positioned up to 30 degrees apart in the top flange of said light support extension canister.

13. An adjustable alignment container set apparatus as set forth in claim 10, wherein said rotation locking means for securing said light support extension canister against rotation comprises an Allen screw set in a side wall of said light support extension canister and positioned for rotation locking contact with said container base.

14. An adjustable alignment container set apparatus as set forth in claim 13, wherein said rotation locking means for securing said light support extension canister against rotation comprises a plurality of Allen screw sets in the side wall of said light support extension canister and positioned for rotation locking contact with said container base.

15. A method of adjusting the height and alignment of an airport inset light, comprising:

(a) providing a light fixture support for an airport runway, taxiway, or other aircraft ground traffic area, said fixture containing a container base for partially embedded placement in an airport runway, taxiway, or other aircraft ground traffic area and means for holding an airport inset light; and (b) providing a rotatably adjustable fixture extension to adjust the height and alignment of said airport inset light supported by said light fixture support.

16. A method of adjusting the height and alignment of an airport inset light as set forth in claim 15, further comprising rotatably adjusting the azimuth alignment of said airport inset light supported by said light fixture support by plus or minus one degree or more and the height of said light by plus or minus 0.02 inches or more.

17. A method of adjusting the height and alignment of an airport inset light as set forth in claim 15, wherein said step of providing a rotatably adjustable fixture extension comprises providing a light support extension canister for holding said airport inset light and having screw threading means for rotatable attachment to said container base, whereby said light support extension canister can be rotated to align the azimuth of said airport inset light with respect to the horizon and to other airport inset lights.

18. An airport inset light adjustable alignment container set apparatus, comprising:

(a) a light fixture support having a container base for placement as a partially embedded support for a light fixture in an airport runway, taxiway, or other aircraft ground traffic area;

(b) means on said light fixture support for holding an airport inset light;

(c) variable length extension means connected to said container base for rotatably adjusting the azimuth alignment of the airport inset light supported by said light fixture support by plus or minus one degree or more and for rotatably adjusting the height of the airport inset light supported by said light fixture support by plus or minus 0.02 inches or more, said variable length extension means comprising:

(d) a light support extension canister having outside screw threading means for rotatable attachment to an inside thread on said container base provided by an Acme screw thread of at least about 4 threads per inch;

(e) light attachment means on a top flange of said light support extension canister for securing the airport inset light to at least one of a plurality of at least 12 bolt holes spaced substantially equally apart and positioned up to 30 degrees apart in the top flange of said light support extension canister; and (f) rotation locking means for securing said light support extension canister against further rotation through said screw threading means connected to said container base.

* * * * *